United States Patent [19]

Wodis

[11] Patent Number: 4,815,846

[45] Date of Patent: Mar. 28, 1989

[54] TORIC SOFT CONTACT LENS HOLDER

[76] Inventor: Michael Wodis, 8748 N. Wisner, Niles, Ill. 60648

[21] Appl. No.: 816,908

[22] Filed: Jan. 8, 1986

[51] Int. Cl.$^4$ .............................................. G01B 9/00
[52] U.S. Cl. .................................... 356/124; 356/244
[58] Field of Search ............... 356/124, 125, 126, 127, 356/244

[56] References Cited

U.S. PATENT DOCUMENTS

| | | | |
|---|---|---|---|
| 996,017 | 6/1911 | Haynes | 356/127 |
| 3,731,670 | 6/1974 | McCormack | 356/124 |
| 3,779,648 | 12/1973 | Poster | 356/124 |
| 4,072,428 | 2/1978 | Moss | 356/125 |
| 4,232,966 | 11/1980 | Schpak et al. | 356/124 |
| 4,277,172 | 7/1981 | Richards | 356/125 |
| 4,415,076 | 11/1983 | Campbell | 356/124 |
| 4,496,243 | 1/1985 | Machida | 356/125 |

Primary Examiner—Richard A. Rosenberger

[57] ABSTRACT

An apparatus for positioning a toric soft contact lens in relation to an optical measuring instrument includes discs for supporting the contact lens and a handle for rotatably holding the discs. Separate discs are provided for front vertex power measurements and for back vertex power measurements. Spacers are provided for advantageously positioning the discs on the lens rest of the measuring instrument. Methods are described for verifying lens markings with the device. The device can also be used as an aid in lens inspection.

9 Claims, 1 Drawing Sheet

TORIC SOFT CONTACT LENS HOLDER

BACKGROUND OF THE INVENTION

This invention relates to devices for measuring soft contact lenses and, more particularly, to devices for measuring the powers and axes of toric soft contact lenses. The invention also permits inspection of the lenses for defects.

It is common practice to verify the lens strength of spectacle lenses and rigid contact lenses prior to dispensing the lenses to the patient. Although soft contact lens prescriptions are equally as important, it is accepted practice to dispense soft lenses to the patient without verifying the accuracy of the prescription. Soft lenses are not verified because of the difficulties involved in the procedures used at this time.

The current procedure for measuring soft lens power involves first blotting the lens to remove excess surface saline. The lens is then picked up with a tweezers or the fingertips, and then placed on the lens rest of an instrument. Proper placement of the lens is difficult because of the wet, sticky surface of the lens and its floppy consistency. If the lens is improperly placed on the lens rest it must be lifted off and repositioned. At times the lens is properly positioned, but the reading must be repeated due to uneven surface wetness. However, the lens must be checked quickly because the instrument reading will be wrong if the lens dries too much. If it becomes too dry, it must be rehydrated for several minutes before retesting is attempted. After the reading is completed, the lens is removed from the lens rest and returned to its vial. At this point, lifting the lens requires great care with some instruments due to the strong tendency of the lens to cling. Unfortunately, this type of handling can damage a soft lens. The lens is also prone to contamination from the lens rest.

In addition to the above difficulties, measuring toric soft lenses presents further problems. The markings on the lenses must be properly oriented as the lens is placed on the instrument so that the lens axis can be accurately read. The markings are very faint, making them difficult to see when positioning the lens on the instrument lens rest. Also, the markings themselves must be verified.

Several attempts have been made over the years to facilitate making lens power measurements. Wet cells, such as in U.S. Pat. Nos. 3,779,648; 4,277,172; 4,415,076; and 4,496,243 have not come into common use because of the poor accuracy resulting from measuring lens power in saline as opposed to measuring lens power in air. Also, these devices do not aid in orienting toric lenses for axis measurements.

U.S. Pat. No. 3,820,899, issued June 24, 1974, discloses a device for holding soft contact lenses for inspection. As in the previously cited patents, this device fails to address the problem of rotational orientation of toric lenses. Further, the black plexiglass suggested in the patent would make visualization of the lens markings difficult due to the opacity of the material, although the flange configuration required would tend to obscure the markings even if a transparent material were to be used. Although the patent discusses the need for minimizing the vertex distance of the lens, the device creates a vertex distance which would affect measurements of strong lenses adversely. The device described is limited to measurements of front vertex power, whereas many contact lens manufacturers use the back vertex method of measurement.

U.S. Pat. No. 4,072,428, issued Feb. 7, 1978, also discloses a device for holding soft contact lenses. This patent also fails to address the problem of toric lens orientation. The translucent white plastic suggested in the patent would interfere with visualizing the reference markings of the lens. This device is not capable of measuring the front vertex power of lenses being tested, even though several manufacturers measure their lenses by the front vertex method. An additional problem created by this device is the great degree of adhesion of the wet, sticky lens to the described hemisphere due to the intentional close match of lens and hemisphere curvatures. Removing the lens from the hemisphere would require a great amount of care and might result in damage to the lens.

SUMMARY OF THE INVENTION

It is an object of this invention to position toric soft contact lenses for measurement with an optical measuring instrument so that the cylinder axis of the lens can be accurately read. Another object of the invention is to verify the accuracy of the lens markings in relation to the anti-rotational means of that lens. Still another object is to minimize induced vertex distance error by keeping the lens as close to the lens rest as possible. Yet another object is to enable the measurement of either front or back vertex power. Another object is to minimize handling of the lens to avoid damaging it. Still another object is to permit lens power measurements with little time or effort needed.

According to the present invention, a toric soft contact lens holder comprises a choice of discs with central apertures which are rotatably captive in a handle. The blotted lens adheres to the disc when the inverted lens holder is gently brought into contact with it. The lens holder is turned right-side-up and, in the case of a toric soft lens, the disc is rotated until the lens markings are coincident with the proper references on the handle. The lens holder is then held horizontally above the lens measuring instrument and placed on the lens rest. Power and axis measurements are then taken. Spherical lenses are measured similarly, omitting the rotational alignment step.

The back vertex disc has a larger, straight aperture as opposed to the front vertex disc which has a smaller aperture with a countersunk taper. The discs are easily interchangeable.

To permit measurements on instruments with certain types of lens rests, spacers are provided to allow proper positioning of the apparatus with those instruments.

An alternate method of verifying lens markings is disclosed wherein the lens is rotated to place the lens stabilization means (such as prism, truncation, thin zones, or peri-ballast), in proper horizontal or vertical alignment prior to verifying lens markings and/or cylinder axis.

The above objects, features, and advantages of the present invention will become more apparent from the following description when taken in conjunction with the accompanying drawings in which a preferred embodiment of the invention is shown by way of example.

DETAILED DESCRIPTION OF THE PREFERRED EMBODIMENT

Figure 1:
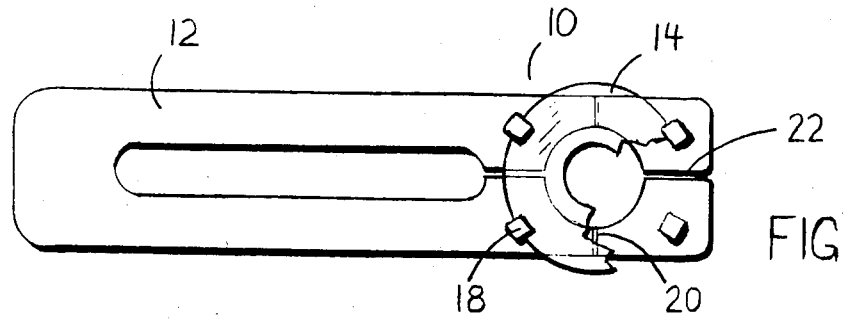
FIG. 1 is a plan view, partially broken away, of the lens holder of the present invention.
Figure 2:
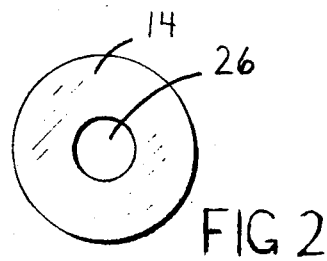
FIG. 2 is a plan view of the back vertex disc.
Figure 3:
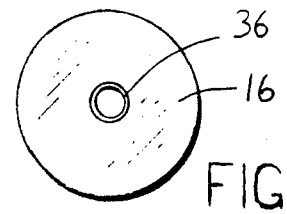
FIG. 3 is a plan view of the front vertex disc.
Figure 4:
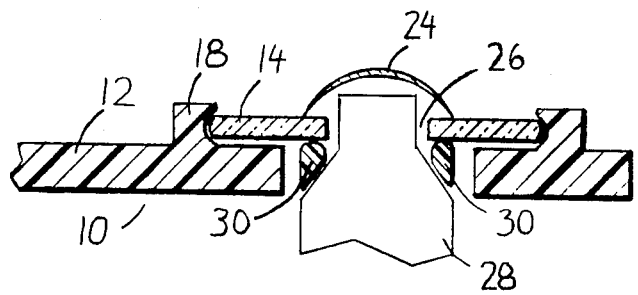
FIG. 4 is an enlarged side sectional view of the lens holder, showing the back vertex disc, a soft lens, a lens rest spacer, and a schematic of a lens rest.

As shown in FIG. 1, a toric soft contact lens holder, generally referred to as 10, constructed in accordance with the present invention includes a handle 12, which is the body of the apparatus, and a disc. The disc illustrated in FIG. 1 is the back vertex disc 14 which is also shown in FIGS. 2 and 4. The front vertex disc 16, shown in FIGS. 3 and 5, can be easily interchanged with the back vertex disc. The handle 12 is U-shaped to impart a springiness to the disc end of the holder, so that when a disc is inserted, it spreads the disc retainers 18 slightly to create a small degree of tension. This tension prevents the disc from rotating inadvertently.

Once again referring to FIG. 1, two sets of reference lines are shown on the handle 12. The vertical reference lines 20 are molded, printed, scribed, or otherwise marked onto the handle. The horizontal reference lines 22, which share a common direction with the long axis of the holder 10, are actually the inwardly extending edges of the U-shaped handle.

FIG. 4 shows a lens in position for back vertex measurement. The back vertex disc aperture 26 is large enough to allow the top portion of narrower lens rests, as exemplified by 28, to extend through. This is desirable, minimizing measurement error by allowing a smaller vertex distance between the instrument and the lens 24. The disc retainers 18 are glued on the handle 12 or are molded integrally with it. Also seen in FIG. 4 is a cross-section of a lens rest spacer 30, which is used to prevent the narrow lens rest 28 from extending through enough to contact and lift the lens being measured. If the lens rest spacer were not to be used in this instance, the lens might become contaminated with foreign material from the lens rest, but it would not adversely affect the measurement of the lens. Broader lens rests such as 32 in FIG. 5 don't extend through enough to contact the lens and therefore would not require a spacer.

Figure 5:
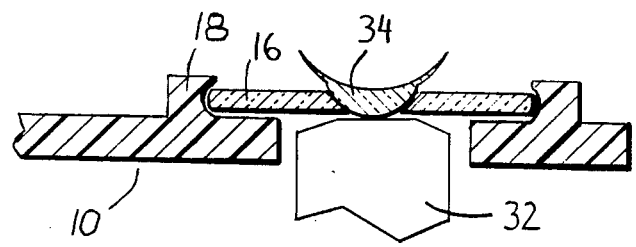
FIG. 5 is an enlarged side sectional view of the lens holder, showing the front vertex disc, a soft lens, and a schematic of a lens rest.

FIG. 5 shows a strong contact lens 34 in position for front vertex measurement.

To measure back vertex power, the soft contact lens 24 is blotted partially dry with an absorbent material and left concave side up. The lens holder 10, with back vertex disc 14 in place, is inverted and held over the lens. It is carefully lowered so that the lens and the disc are concentric. When the still-damp lens is contacted by the disc it will adhere to it. The lens holder is then turned right-side-up so that the lens can be measured.

If the lens is spherical, the disc can then be placed on the lens measuring instrument lens rest, as in FIG. 4. The back vertex power is then read from the instrument.

If the lens is toric, it must first be rotated into a top-up position on the lens holder prior to placement on the measuring instrument. Proper rotational orientation is accomplished by turning the back vertex disc 14 so that the toric lens markings are in proper alignment with either the vertical or horizontal reference lines of the contact lens holder. Prism and peri-ballast lenses will be marked with a dot, line, set of lines, or truncation at the bottom of the lens which should be in alignment with the vertical reference lines 20. Toric lenses with thin zones as a stabilization means will have two horizontal scribe marks which should be in alignment with the horizontal reference lines 22. With the lens oriented as described, the lens holder 10 is positioned above the lens measuring instrument with the handle 12 held parallel to the spectacle platform of the instrument, which in effect puts the handle 12, the horizontal reference lines 22, and therefore the horizontal meridian of the contact lens coincident with the horizontal meridian of the lens measuring instrument. The back vertex disc is then placed on the lens rest of the instrument and the lens power, including cylinder axis, is read from the instrument.

Measurement of front vertex power is accomplished in a similar fashion. The lens is left convex-side-up after blotting, and is picked up with the front vertex disc in the holder. The front vertex disc aperture wall 36 has a countersink configuration which generally conforms to the convex curvature of soft lenses.

If the lens is spherical, the front vertex disc can then be placed on the lens rest 32 as in FIG. 5. The front vertex power of the lens is then read from the instrument.

Front vertex measurement of toric lenses requires rotation and positioning of the lens and disc as described above for back vertex measurement. When measuring the front vertex power of any cylindrical lens, however, a correction must be made in the cylinder axis reading. Instruments are universally designed to read cylinder axes in a back vertex manner, and lenses measured in a front vertex manner will show a mirror-type reversal. To compensate for this reversal, the operator could calculate the degrees to the right or left of 90° of the measured axis, and then determine what the "mirror" axis would be. For example, if the front vertex axis were 78°, which is 12° to the right of 90°, the correct axis would be 12° to the left of 90°, or 102°. Alternately, the operator could consult an axis conversion chart, which would simply list all of the degrees from 1° to 180° and their mirror-reversal counterparts. Another approach would be to actually measure the axis in a back vertex manner to avoid confusion. An important consideration is that lens power readings on weaker lenses will be the same regardless of whether they are measured in front or back vertex manner. Because the majority of toric lenses dispensed are weaker lenses, most lenses can be read in back vertex form even if the manufacturer of that particular type of lens specifies front vertex power. The reversal question is then an academic point for most lenses other than higher plus toric lenses produced by those manufacturers specifying front vertex power.

After the measurement is completed, the lens is easily removed by inverting the holder over the material that was used to blot the lens, and dripping a small amount of saline through the disc aperture 26 or 36. This additional fluid loosens the lens from the disc, causing it to drop onto the material. In contrast, if the lens measurement were to be performed in the conventional manner, by placing the lens directly onto the instrument lens rest, the lens will at times become difficult to remove. To achieve the same ease of removal from the lens rest as is afforded with the present invention, the operator would have to actually invert the entire instrument and drip saline onto the lens rest, which is obviously not a recommended procedure.

To inspect the lens, the lens is most frequently picked up with the back vertex disc 14 in place. The larger aperture 26 of the back vertex disc allows a greater portion of the lens to be inspected without background. At times, however, the edge of the lens will require close examination, in which case use of the front vertex disc 16 will be more desirable as it will allow the entire edge of the lens to stand free, as shown in FIG. 5.

Figure 6:
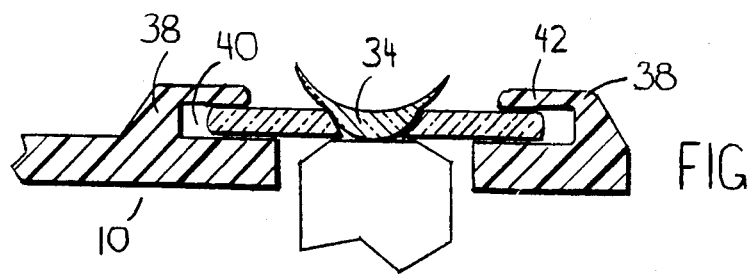
FIG. 6 is an enlarged sectional side view of the lens holder, showing an alternate disc retainer construction.

An alternate embodiment of the present invention is shown in FIG. 6. Whereas in the preferred embodiment the discs 14 and 16 are limited to rotational movement, the discs in the alternate embodiment have freedom to move rotationally, horizontally, and vertically. In this embodiment, the spring disc retainers 38 are situated further apart from each other than the greatest dimension of the disc, (shown here as the front vertex disc 16),creating disc space 40. Disc position is maintained by downward pressure from the spring retainer tab 42 which is formed integral with the spring retainer 38. The advantage of this embodiment is that the lens can be moved horizontally and/or vertically to position the contact lens 34 concentrically with the handle aperture wall 44, thereby improving the accuracy with which the contact lens orientation marks are aligned with the horizontal or vertical reference lines 22 or 20. In the preferred embodiment, a malpositioning of the contact lens on the device is compensated for visually as the lens markings are aligned with the reference lines. The disadvantage of the alternate embodiment lies in the greater degree of care necessary to correctly position the disc.

It should be pointed out that the front vertex disc 16 will also serve for measurements of back vertex power. Although this method will yield good results with weaker lenses, it becomes disadvantageous for measuring stronger contact lenses because the lenses will be higher above the lens rest, inducing vertex distance error.

The lens rest spacer 30 shown in FIG. 4 is only needed for those few lens measuring instruments which have narrow, elongated lens rests which would protrude through the back vertex disc aperture 26 sufficiently to touch the contact lens 24. Use of the spacer is simple—the spacer is merely slipped onto the lens rest 28. As the spacer does not interfere with any other use of the lens measuring instrument, it can be left in position permanently.

As is commonly known, the orientation of the toric lens cylinder while on the wearer's eye depends on the effects of gravity and on the interaction between the eyelids and the varying thicknesses and shapes of the toric lens edge. These different thicknesses and shapes comprise the lens stabilization means, such as prism, truncation, thin zones, peri-ballast, etc. The cylinder axis position on the eye is therefore dependent on the lens rotation as determined by the stabilization means. The lens markings are an indication of the position, within the lens, of the lens stabilization means.

In the foregoing discussion, toric lens verification was done by first orienting the lens marks, then measuring the lens in that position. This method follows common practice, but assumes that the markings are properly placed in regard to the stabilization means.

By using a different method, the present invention can be used to verify the lens markings also. This method consists of first orienting the lens rotationally, using its stabilization means, and then measuring the lens power and the accuracy of the lens markings. To use this method for prism lenses, the lens is picked up with the invention and held in position on the lens measuring instrument. The lens is then rotated so that the prism is in a base-down position, allowing the power and cylinder axis to be measured and recorded. The lens is then removed from the measuring instrument and held so that the lens marks can be seen. If the lens marks are in proper position, no further action is necessary. If the lens markings are found to be mislocated, the lens and holder can be positioned above a protractor to determine the error in degrees. Alternately, the disc can be rotated to place the lens mark in conjunction with the vertical reference mark 20 of the device. By placing the device back on the lens measuring instrument, the degrees of shift in the measured axis can be noted, which will also show the error in the position of the mark.

The positions of thin zones and peri-ballast configurations are visible when the lens is on the holder and held a short distance in front of a patterned background such as desks, chairs, etc. In the case of these lens types, the lens (in position on the holder) is first rotated to put the thin zones or peri-ballast configuration in proper position. The lens power and the accuracy of the reference marks can then be determined as described above for prism lenses. Truncations can be similarly evaluated.

The material used to construct the present invention should be non-corroding due to the use of saline solution. As the discs 14 and 16 are preferably transparent, and because a degree of
springiness is desirable in the handle 12 or, alternately, the spring retainers 38, a material such as available in certain plastics would satisfy the materials requirements.

The discs 14 and 16, being removable, are easily cleaned. The entire apparatus is easily disinfected with chemical disinfecting solution.

To summarize the use of the apparatus, the operator simply touches the blotted lens 24 or 34 with the appropriate disc 14 or 16 in the lens holder 10, turns the disc to orient the lens if it is a toric lens, and then positions the holder on a lens measuring instrument. After measuring the lens, the operator simply inverts the device and drips a small amount of saline through the disc aperture so that the lens drops from the disc. To use for inspection, the device need only be used to pick up the lens. It is readily apparent that measuring soft lens power, whether front or back vertex power, which had previously been so cumbersome that it was avoided, is a much faster, simpler, and more accurate procedure with the aid of the present invention. It is also apparent that the risk of damage to or contamination of the lens is negligible in that no tweezers are required, and that handling the slowly drying lens on a lens rest is avoided.

While the principles of the invention have been described in connection with specific apparatus and applications, this description is made only by way of example, and not as a limitation on the scope of the invention.

I claim:

1. An apparatus for positioning a toric soft contact lens in a manner minimizing vertex distance relative to an optical measuring instrument, comprising means for supporting and orienting said lens for cooperation with said optical measuring instrument, said lens supporting and orienting means comprising an element having an aperture therethrough and adapted to be positioned such that a lens rest of said optical measuring instrument is disposed at least adjacent said toric soft contact lens for making measurements of said lens through said optical measuring instrument, said element comprising lens supporting and orienting means including means extending beyond the periphery of said toric soft contact lens to facilitate rotational movement for orienting said toric soft contact lens rotationally for cooperating with said optical measuring instrument, and means for holding said lens supporting and orienting means in position relative to said optical measuring instrument, said holding means including means for retaining said lens supporting and orienting means in said relative position, whereby the power of said toric soft contact lens can be accurately measured.

2. The apparatus of claim 1 wherein said element comprising said lens supporting and orienting means includes means extending beyond the periphery of said toric soft contact lens to facilitate rotational and sliding movement for orienting said toric soft contact lens vertically, horizontally, and rotationally for cooperating with said optical measuring instrument.

3. The apparatus of claim 1 wherein said holding means comprises a handle having an aperture therein, said element comprising said lens supporting and orienting means being disposed over said aperture in said handle, said handle aperture being sized such that said lens rest of said optical measuring instrument can extend therethrough 4. The apparatus of claim 3 including a separate lens rest spacer, said lens rest spacer being adapted to cooperate with said lens rest of said optical measuring instrument to limit the extent to which said lens rest may extend through said aperture in said element, said lens rest spacer being adapted to prevent said lens rest from contacting said toric soft contact lens.

5. The apparatus of claim 1 including a pair of elements comprising said lens supporting and orienting means, one of said pair of elements being adapted for positioning said toric soft contact lens for front vertex power measurements, the other of said pair of elements being adapted for positioning said toric soft contact lens for back vertex power measurements, said elements being interchangeably associated with said holding means.

6. A method for measuring a toric soft contact lens to determine power, cylinder axis and degree of error in lens orientation markings, comprising the steps of:
  a. placing said toric soft contact lens on a rotatable element, said rotatable element including means extending beyond the periphery of said toric soft contact lens to facilitate rotational movement for orienting said toric soft contact lens, said rotatable element being supported by holding means, said holding means including means for retaining said lens supporting and orienting means in a position of rotational adjustment, said rotatable element having an aperture therethrough and adapted to be positioned such that a lens rest of an optical measuring instrument is disposed at least adjacent the plane of said toric soft contact lens, said lens having stabilization means integral therewith;
  b. turning said rotatable element relative to said holding means until said lens stabilization means is in a desired position relative to said holding means;
  c. placing said holding means on said optical measuring instrument with said lens rest of said optical measuring instrument disposed at least adjacent the plane of said toric soft contact lens;
  d. measuring the power and cylinder axis of said lens with said optical measuring instrument;
  e. removing said holding means from said optical measuring instrument; and
  f. determining the degree of error of said lens orientation markings.

7. The method of claim 6 wherein said step of determining the degree of error of said lens orientation markings comprises turning said rotatable element until said lens orientation markings are in a desired position relative to said holding means and returning said holding means to said optical measuring instrument to remeasure the cylinder axis of said lens with the difference in said measured cylinder axes indicating the error of said lens orientation markings.

8. The method of claim 6 wherein said step of determining the degree of error of said lens orientation markings comprises the additional steps of providing a protractor and holding said holding means in relation to said protractor to measure the error of said lens orientation markings.

9. An apparatus for positioning a toric soft contact lens in a manner minimizing vertex distance relative to an optical measuring instrument, comprising means for supporting and orienting said lens for cooperation with said optical measuring instrument, said lens supporting and orienting means comprising a disc having an aperture therethrough and adapted to be positioned such that a lens rest of said optical measuring instrument is disposed at least adjacent the plane of said toric soft contact lens for making measurements of said lens with said optical measuring instrument, and means for holding said lens supporting and orienting means in position relative to said optical measuring instrument, said holding means including a plurality of disc retainers accommodating rotational movement of said lens supporting and orienting means for positioning said lens for optical measurement.

* * * * *